United States Patent
Li et al.

(10) Patent No.: US 10,489,903 B2
(45) Date of Patent: Nov. 26, 2019

(54) STEPWISE REFINEMENT DETECTION METHOD FOR PAVEMENT CRACKS

(71) Applicant: WUHAN WUDA ZOYON SCIENCE AND TECHNOLOGY CO., LTD., Hubei Province (CN)

(72) Inventors: Qingquan Li, Hubei Province (CN); Dejin Zhang, Hubei Province (CN); Min Cao, Hubei Province (CN); Hong Lin, Hubei Province (CN)

(73) Assignee: WUHAN WUDA ZOYON SCIENCE AND TECHNOLOGY CO., LTD., Hubei Province (CN)

( * ) Notice: Subject to any disclaimer, the term of this patent is extended or adjusted under 35 U.S.C. 154(b) by 176 days.

(21) Appl. No.: 15/570,207

(22) PCT Filed: Apr. 27, 2015

(86) PCT No.: PCT/CN2015/077528
§ 371 (c)(1),
(2) Date: Oct. 27, 2017

(87) PCT Pub. No.: WO2016/172827
PCT Pub. Date: Nov. 3, 2016

(65) Prior Publication Data
US 2018/0137612 A1    May 17, 2018

(51) Int. Cl.
*G06T 7/00*      (2017.01)
*G06T 7/187*     (2017.01)
(Continued)

(52) U.S. Cl.
CPC ............... *G06T 7/001* (2013.01); *G06T 7/11* (2017.01); *G06T 7/136* (2017.01); *G06T 7/187* (2017.01);
(Continued)

(58) Field of Classification Search
None
See application file for complete search history.

(56) References Cited

U.S. PATENT DOCUMENTS

| 6,615,648 B1* | 9/2003 | Ferguson ............... G01C 7/04 |
| | | 702/127 |
| 2010/0177191 A1* | 7/2010 | Stier ............... G01N 21/8806 |
| | | 348/92 |
| 2010/0184903 A1 | 7/2010 | Pharr |

FOREIGN PATENT DOCUMENTS

| CN | 103870833 | 6/2014 |
| CN | 103903268 | 7/2014 |

* cited by examiner

*Primary Examiner* — Vikkram Bali
(74) *Attorney, Agent, or Firm* — IP & T Group LLP (57) ABSTRACT

The present invention discloses a stepwise refinement detection method for pavement cracks, processing pavement images comprising the following primary steps: extracting and processing marking lines, extracting ROA, adaptive threshold segmentation based on ROA, extracting ROC and region growth based on ROC direction feature weighting. The present invention rapidly extracts ROA based on that cracks are a set of pixel points which have similar grayscale and have distinct spatial accumulation features; rapidly locates the possible grayscale intervals and spatial locations of the cracks by ROA, realizes an adaptive threshold segmentation for images, establishes a confidence evaluation criterion, and accurately extracts ROC; accurately evaluates the development trend of the cracks based on the evaluation method for crack growth direction by segment weighting; utilizes an improved region growth method, uses the regions of confidence as seed regions, grows along the development trend of the seed regions, and sufficiently guarantees the accuracy of the crack growth and the completeness of the crack detection.

8 Claims, 6 Drawing Sheets

(51) Int. Cl.
*G06T 7/136* (2017.01)
*G06T 7/11* (2017.01)
(52) U.S. Cl.
CPC ............... *G06T 2207/20008* (2013.01); *G06T 2207/30132* (2013.01)

STEPWISE REFINEMENT DETECTION METHOD FOR PAVEMENT CRACKS

This application is a national stage application of PCT/CN2015/077528 filed on Apr. 27, 2015. The disclosure of each of the foregoing applications is incorporated herein by reference in its entirety.

TECHNICAL FIELD

The present invention relates to the field of pavement detection technology and computer image processing technology, and more particularly, to a detection method for pavement cracks.

BACKGROUND

Since roads are influenced by a plenty of factors such as natural environment, traffic load, material properties, etc. in the process of operation, various damages will appear gradually on their surfaces. Cracks, as one of the most primary damage types of asphalt pavement, seriously affect the driving speed and driving safety, aggravate the vehicle wear, and also shorten the service life of the asphalt pavement. In order to save the maintenance resources, and guarantee the driving safety and comfort, there is a need for rapidly and accurately obtaining parameter information such as the location, area and degree etc. of the road damages, so as to provide the basis for the traffic management departments to objectively evaluate the road quality and scientifically determine the maintenance management schemes.

At present, with the development of technologies such as sensors, automatic control and computer etc., the automatic collection apparatuses for pavement images have approached to be mature, while the later crack identification is still in a man-machine combination or even completely manual way, which has heavy workload and low efficiency. However, in most cases, the number of images with damages in the collected highway images is often less than 10% of the total number of images. If an effective classification method for images with and without damages can be provided, the workload of manual identification will be reduced by 90%; if an efficient automatic identification method for asphalt pavement cracks can be provided, a sufficient basis can be provided for the traffic management departments to objectively and timely evaluate the road quality and scientifically determine the maintenance schemes.

Most of the existing identification methods for cracks utilize an "identification-first-then-classification" processing mode. Under this processing mode, the current mainstream crack identification methods based on images are mainly as follows:

(1) Crack identification method based on grayscale threshold, which selects appropriate grayscale thresholds to distinguish the image background and the targets by analyzing the grayscale features of pavement images. This method is generally based on the precondition that the grayscale of the cracks is usually lower than that of the background, and requires the cracks to be with high contrast and good continuity. However, due to the reasons of pavement fouling, crack wall exfoliation, and plentiful pavement grain texture, etc., the cracks often have features of low contrast and poor continuity, etc.; therefore the crack identification method based on grayscale threshold is difficult to identify damages with indistinctive grayscale features.

(2) Crack identification method based on morphological processing, which uses corrosion, expansion, skeleton extraction, edge detection and other methods to obtain the two-dimensional morphological features of the cracks. However, due to the complex pavement images and various damage forms, the identification method based on morphological processing is not highly practicable.

(3) Crack identification method based on machine learning, which is mainly used for the type classification after crack detection, the key thereof lies in the features extraction of the pavement cracks and the design of classifier. Due to the complex road conditions and various crack forms, the features extraction of the cracks is more difficult. Meanwhile, the accuracy, robustness and real-time of the classification algorithm are restricted by the factors of small test sample sets, complex algorithm and large calculation load etc.

(4) Identification method for pavement cracks based on multi-scale geometric analysis, which usually uses image geometric features and utilizes wavelet, ridgelet, curvelet, contourlet, bandelet and other transformations to express image information. Since the asphalt pavement cracks under complex background are irregular and the forms and locations of the cracks are unpredictable, this method cannot effectively extract complex crack information. Meanwhile, the problems of complicated calculation process and low efficiency are prevalent among multi-scale analysis methods.

Most of the existing crack detection techniques are based on good image quality; they lack the adaptability to complex environments, which is difficult to meet the practical requirements for engineering applications. Due to the influences from the factors of complex pavement structure types, uneven illumination, shadow, foreign objects on pavement and artificial marks etc., the pavement images have uneven grayscale distributions, plentiful textures, small spectrum differences, blurred edges, noise pollution and other features. The actual engineering tests show that due to the influence of natural light, street trees, buildings, pavement materials and other external factors, the collected images may have uneven illumination, large shadow, lot of debris, excessive exposure, plentiful markings and so on. Secondly, in the process of high-speed driving collection, the camera of the data collection unit and the laser cannot be absolutely maintained in the same plane due to the relative movement, so that the collected data have light and dark stripes which are shown as uneven illumination. Furthermore, the paving materials of the asphalt pavement have a strong sense of grains and are different in sizes, resulting in plentiful textures in the pavement images, which weakens or destroys the visualization features of the cracks. According to the analysis of the existing research results, the main factors that affect the crack identification are uneven illumination, shadows, marking lines, textures, etc. Uneven illumination and shadows may cover part of the features of pavement damages, which is not conducive to the extraction of pavement damage features. Interferences such as marking lines, textures etc. have some similar features with the cracks and other damaged targets, which are easy to be confused with the cracks, leading to erroneous detections. It is rather difficult to realize the crack identification by extracting crack features with high distinction directly from the original image information. Additionally, in general, the number of the images with damages in the collected highway images is in small proportion of the total number of images. If the same identification method as that for the pavement images with damages is used, the time complexity of the processing is greatly increased.

Meanwhile, most of the existing techniques are based on the assumption that the grayscale value of the cracks is lower than that of the image background, the crack target is clear, continuous and with distinct geometric features. However, on the actual pavements, due to the rolling form loaded wheels, weathering, pavement fouling, crack wall exfoliation and other reasons, the cracks usually have low contrast, poor continuity and other features. Meanwhile, since the grouting phenomenon occurs due to water flowing into the road base, the grayscale value of cracks is higher than that of the pavement background, which is shown as "white cracks" phenomenon. Thus it can be known that the assumption of the existing techniques is not fully established in practical applications. Therefore, the prior art cannot solve the problems of detecting the cracks that are small and have weak contrast, weak continuity, and detecting the "white cracks".

SUMMARY

The technical problem to be solved by the present invention is to provide a stepwise refinement detection method for pavement cracks, so as to overcome the defects such as poor real-time performance, low identification rate, unable to meet the practical application requirements, etc. that commonly exist in the current automatic identification methods for cracks.

In order to solve the technical problem above, the present invention provides a stepwise refinement detection method for pavement cracks, comprising: collecting pavement images, analyzing the pavement images, characterized in that analyzing the pavement images comprises the following steps:

extracting suspected crack regions of accumulation ROA, comprising: extracting the connected regions with certain grayscale features in the pavement images, screening the connected regions according to certain preset conditions to obtain the suspected crack regions of accumulation; the preset conditions are prior obtained according to the geometric features of the crack regions.

The suspected crack regions of accumulation ROA are not isolated pixels, but regions which are accumulated by some pixel points with similar grayscale and satisfy the morphological features of crack accumulation.

Further, the method also comprises the step: extracting crack regions of confidence ROC, comprising:

for screened ROA regions, establishing a target determination system to screen out initial crack confidence regions with a certain degree of crack confidence by the geometry, spatial location and grayscale statistic features of ROA regions;

for the initial crack confidence regions connecting and merging the regions with close locations and similarities according to the spatial locations and regional similarities between the initial crack confidence regions, so as to form enhanced crack confidence regions, i.e. the crack regions of confidence ROC.

Further, the method also comprises the step: region growth based on ROC direction feature weighting, comprising:

step 4-1. extracting feature vectors of the directions and lengths of all ROCs;

step 4-2. calculating search range from the longest ROC;

step 4-3. searching all growable regions within the range;

step 4-4. merging ROCs and the growable regions: for all regions in the growable region set, merging the regions with close locations sequentially according to the spatial location relation between ROCs and the growable regions, then terminating the current ROC growth;

step 4-5. determining the composition of cracks: if the current ROC growth stops, determining whether the crack conditions are satisfied according to the total length $R_{growlen}$ of the grown regions; if satisfied, proceeding to step 4-6, otherwise the region growth is completed;

step 4-6. extending the next ROC: repeating step 4-2 to step 4-5 from the next ROC till the growths of all ROCs are completed, then the region growth is completed.

Before extracting the crack regions of confidence ROC, the method also comprises the step:

segmenting the images by adaptive threshold based on ROA, comprising:

dividing the images into non-overlapping sub-block images; the sub-block images comprising: sub-block image I containing the suspected crack regions of accumulation, sub-block image II which is adjacent to the sub-block image I in location and does not contain the suspected crack regions of accumulation, and sub-block image III which does not contain the suspected crack regions of accumulation and is not adjacent to the sub-block image I;

segmenting the sub-block images I, II and III according to different thresholds respectively; wherein, the segmentation threshold for the sub-block image I is determined according to the grayscale feature of the ROA; the segmentation threshold for the sub-block image II is determined by referring to the adjacent sub-block image I; the sub-block image III is segmented according to the features thereof; obtaining the binary image of each sub-block image respectively.

Further optimized, after segmenting the images by adaptive threshold for ROAs, the method also comprises:

the first round of compensation: determining whether the grayscale value difference between the background pixel points and the surrounding pixel points of interest satisfies the preset range, if satisfied, compensating;

the second round of compensation: compensating according to whether the grayscale value difference between the background pixel points and the pixel points of interest which are centered on the background with a certain direction within the preset range satisfies the preset range, if satisfies, compensating;

performing a close operation for the images processed by the adaptive threshold segmentation.

Preferably, the direction feature weighting method in step S4-1 comprises the following steps:

segmenting the ROC according to linear similarity;

calculating the direction feature vector of each segment;

analyzing the influence of the direction feature vector on the development trend of the crack according to the location information thereof;

assigning a feature weight to each segment based on the influence;

obtaining the development trend θ of the crack in ROC by weight calculating according to formula (1) based on the feature weights, $$\theta = \omega_1\beta_1 + \omega_2\beta_2 + \ldots + \omega_n\beta_n \quad (1)$$

in the formula, $\omega_1, \omega_2, \ldots \omega_n$ are feature weights set according to the different degrees of influence, n represents the crack is divided into n segments, $\omega_1+\omega_2+\ldots+\omega_n=1$.

Preferably, screening the initial crack regions of confidence specifically comprises:

setting Len as the effective length of the current connected region, i.e. the longest side of the circumscribed rectangle with the smallest area, this value reflects the linear feature of the crack; setting $S_{ratio}$ as the area ratio of the circumscribed rectangle $S_{MBR}$ with the smallest area to the smallest circumscribed circle $S_{MCC}$ in ROA region; setting $I_{ratio}$ as the ratio of the grayscale mean value of the connected regions in the original image to that of the region enclosed by the circumscribed rectangle with the smallest area of the current connected region; $I_{ratio}$ is the basis of distinguishing chap, block-crack region and noise region;

if Len>$T_{Len}$ and $S_{ratio}$<$T_{S_{ratio}}$, or Len>$T_{Len}$ and $S_{ratio}$>=$T_{S_{ratio}}$, and $|I_{ratio}-1|$<$T_{I_{ratio}}$, determining this region as the initial crack region of confidence; otherwise, removing this region as the noise region.

Also preferably, forming the enhanced crack region of confidence comprises:

setting Pos as the spatial location of the initial crack region of confidence, ROA regions with close spatial locations may belong to the same crack region, the location relation between two connected regions may be determined by the location relation of their smallest circumscribed rectangles; merging the initial crack regions of confidence with close spatial locations to Pos to form enhanced crack region of confidence.

The optimal solution is that the method also comprises a processing step of removing the marking lines in the images before extracting the suspected crack regions of accumulation ROA.

The processing step of removing the marking lines in the images comprises:

extracting marking line regions, comprising:

dividing complex pavement images into non-overlapping sub-block images according to the grayscale and morphological features of the road marking lines, obtaining the segmentation threshold of the sub-block images according to the differences between the grayscale distribution features of the road marking lines and pavement background to obtain binarized sub-block images;

merging the binarized sub-block images to obtain a number of connected regions comprising noise regions and marking line regions, distinguishing the noise regions and the marking line regions according to the features of the marking line regions;

marking the marking line regions;

processing the marking line regions, comprising: replacing the marking line regions with the image regions around the grayscale corrected marking lines according to marking values of the marking lines, or excluding the marking line regions for consideration in the subsequent process.

The advantageous effects of the present invention:

(1) the present invention summarizes that the marking lines have the features of large grayscale value, smooth texture, regular shape and etc. by observing a large number of pavement marking line regions, and proposes a marking line extracting method based on the image grayscale and variance segmentation according to the features above, overcomes the interference of the marking lines in the pavement images.

(2) the present invention describes the essential features of cracks, understands that cracks are the regions that have similar grayscale and are gathered in space, based on the understandings above, the present invention proposes a rapid locating method for suspected crack regions of accumulation (ROA) by considering the spatial, geometric and grayscale features of the cracks in the image distribution, so as to realize a rapid extraction for the crack regions of accumulation.

(3) the present invention proposes a method for rapidly calculating the grayscale distribution intervals of the cracks through crack regions of accumulation, which considers the influence of the accumulation regions on the surrounding regions, divides the images into different regions, rapidly calculates the grayscale distribution intervals of the cracks in different regions according to the grayscale relation between the accumulation regions and surrounding regions, and realizes an adaptive segmentation for the images in the corresponding regions according to the grayscale distribution intervals.

(4) the present invention proposes an extracting method for crack regions of confidence (ROC). The present invention establishes a confidence determination criterion with the geometry and grayscale statistic features of the crack regions, and screen out the regions with high confidence. For the screened regions, the method connects and merges the accumulation regions with close locations and similarities according to the spatial locations and regional similarity features between the regions, so as to form the regions of confidence ROC.

(5) the present invention proposes a method for estimating the crack growth direction based on segment weighting, which firstly divides the cracks into several crack segments, then comprehensively considers the influence of the direction feature vector of each crack segment on the development trend of the cracks, obtains the final development direction of the cracks by weighting the direction feature vectors of the crack segments based on different influence factors.

(6) the present invention proposes a crack growth method based on the confidence regions and the development trend, which uses ROC as the seed region, designs an appropriate growth range along the development trend of the cracks, connects and merges the regions that satisfy the conditions based on the similarity criterion, so as to realize a complete detection of the cracks.

BRIEF DESCRIPTION OF THE DRAWINGS

The technical solutions of the present invention will now be described in further detail with reference to the accompanying drawings and specific embodiments.

FIGS. 2 (a) to 2 (f) are schematic diagrams of the adaptive threshold segmentation process based on ROA.

FIGS. 3 (a) to 3 (d) are schematic diagrams of the extraction process for the confidence regions.

FIG. 5 is an effect diagram of region growth, wherein

DETAILED DESCRIPTION

Figure 1:
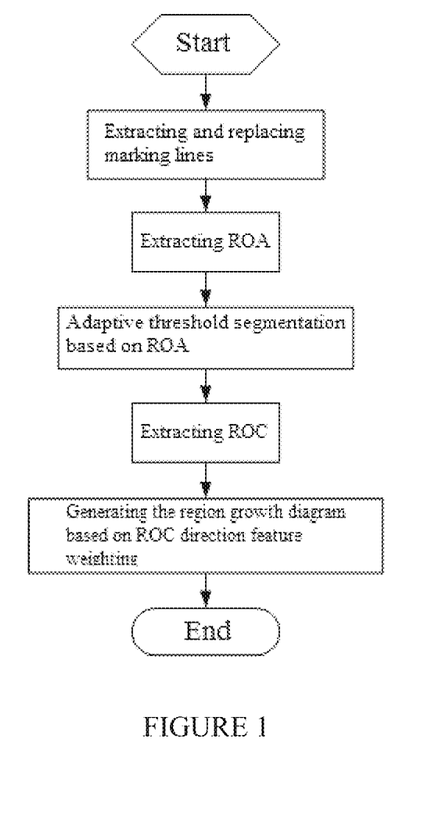
FIG. 1 is an overall processing flow diagram of the present invention.

As illustrated in FIG. 1, the overall processing flow of the present invention comprises:
step 1. extracting and processing marking lines;
step 2. extracting suspected crack regions of accumulation ROA;
step 3. adaptive threshold segmentation Based on ROA;
step 4. extracting crack regions of confidence ROC;
step 5. generating a regional growth map based on ROC directional feature weighting.

Steps 1 to 5 are described in further detail hereinafter.

Figure 6:
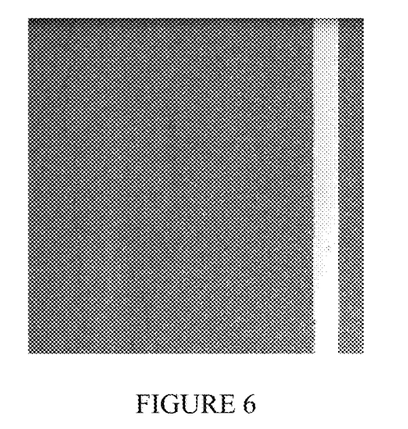
FIG. 6 is a grayscale image of an original image of the collected pavement.
Figure 7:
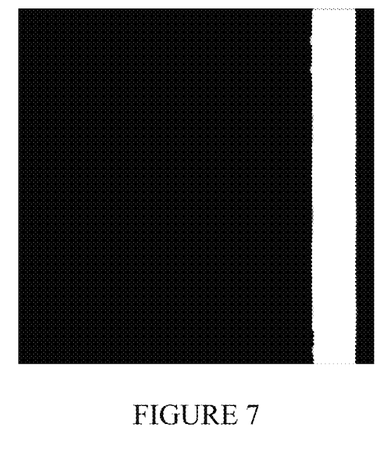
FIG. 7 is an effect diagram of extracting the marking lines of FIG. 6.
Figure 8:
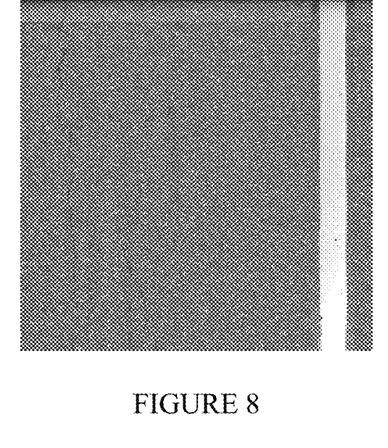
FIG. 8 is a grayscale correction effect diagram of the image containing marking lines.
Figure 9:
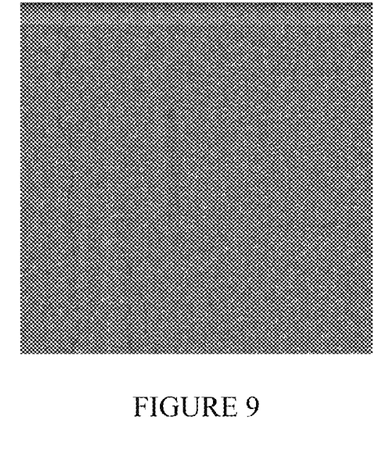
FIG. 9 is a replacement effect diagram of the marking line region.

Step 1. The marking lines refer to white or yellow regions of lane lines, zebra crossing, large spots and large arrows etc., these regions have large grayscale values, smooth textures, and regular shapes as shown in the grayscale images. There are paint cracking or peeling phenomenon on the marking lines or along the edges thereof, after a long period of wear without maintenance these marking lines will represent linear characteristics that will generate a lot of false cracks to affect the identification of real cracks. The marking line extraction and replacement method designed by the present invention according to the features of grayscale, texture, geometry form etc. can effectively overcome the false detection caused by the marking lines. The specific processing is as follows:

step 1-1. extracting marking line regions:
step 1-1-1. dividing complex pavement images as illustrated in FIG. 6 reasonably into non-overlapping image blocks according to the grayscale and morphological features of the road marking lines;

Step 1-1-2. obtaining the segmentation threshold of sub-block images according to the differences between the grayscale distribution features of the road marking lines and pavement background, binarizing the sub-block images;

step 1-1-3. merging the binarized sub-block images to obtain a number of connected regions comprising noise regions and marking line regions, distinguishing the noise regions and the marking line regions according to the features (such as the width, length features) of the marking line regions;

step 1-1-4. marking the marking line regions, as illustrated in FIG. 7; and FIG. 8 is a grayscale correction effect diagram of the images containing marking lines.

step 1-2. processing the marking lines:
replacing the marking line regions with the image regions around the grayscale corrected marking lines according to marking values of the marking lines, or excluding the suspected damages in the marking line regions for consideration in the subsequent process. The effect of replacing the marking lines is illustrated in FIG. 9.

Step 2. it can be found by analyzing a large quantity of collected sample data that cracks are a set of some pixel points that are gathered in space and have similar grayscale, the distribution of the cracks in space is relatively concentrated and the grayscale thereof differs with the background. However, the pixel points differing with the background do not belong to the crack regions which could be formed only when the pixel points with these features are gathered together, that is, the cracks are not presented as isolated points but a set of some pixel points that are gathered in space and have similar grayscale, i.e. the suspected crack regions of accumulation which have certain linear features and certain directions, and also have continuity in space, and certain shapes such as the futures of length, width etc. Furthermore, the pixels of the cracks are in a small proportion of the entire image. The present invention comprehensively considers the features of grayscale, statistics, spatial distribution and geometry etc. of the cracks to extract the suspected crack regions of accumulation ROA that can roughly locate the regions where the cracks are located and the grayscale interval of the cracks, so as to provide a reference basis for the subsequent process. The principle of extracting ROA is extracting the connected regions with similar grayscale first, and then obtaining the connected regions that satisfy the preset conditions by screening according to the geometry features of the crack regions. The specific process of extracting ROA utilized by the present specific embodiment is as follows:

step 2-1. calculating the most stable external regions MSERs of the preprocessed images with the spatial distribution features and grayscale features of the cracks.

The MSERs algorithm is as follows:
calculating the binarized threshold range $[T_{min}, T_{max}]$ of the image with formula (2), provided that the proportion range of the cracks in the image is $[P_{min}, P_{max}]$.

$$\sum_{n=0}^{T} hist(n) \le P \times H \times W \qquad (2)$$

In the formula, H, W are the height and width of the image, hist(i) is the grayscale histogram of the image, T is the grayscale segmentation threshold that satisfies the condition, and P is the proportion of the cracks in the image (experimental statistics).

Decreasing the grayscale threshold stepwise from $T_{max}$ to $T_{min}$, preserving the pixel points whose grayscale value is less than or equal to the threshold, so as to obtain the binary image and the corresponding connected regions.

If the size of the connected regions obtained with different segmentation thresholds maintains consistent within t ($t < T_{max} - T_{min}$) times and the total area thereof is not less than $A_T$, these regions are MSERs.

step 2-2. removing MSERs whose lengths do not meet the requirements according to the morphological features of the cracks, so as to obtain ROA.

Of course, inspired by the above description, a person skilled in the art is able to come up with other methods to obtain the desired ROA.

Step 3. it can be known from the observations and the reasons of forming cracks that, cracks will expand and develop outward from the main cracks, the extracted ROA can accurately locate the spatial location of the main cracks but cannot guarantee a complete detection for the crack regions, therefore, the regions other than ROA still need to be divided and then subjected to the binary image processing in order to avoid missing the crack regions. Considering that ROA has different influence ranges on the regions that have different distances therefrom, the present invention will divide the images into different regions according to the distance relations with ROA, and process the different regions with different segmentation thresholds so as to improve the adaptability of the image segmentation method. The process of the present specific embodiment is as follows:

step 3-1. dividing the image into non-overlapping sub-blocks.

step 3-2. classifying the sub-block images, considering the similarity of the sub-block images where the same connected regions or the connected regions with similar locations are located. The classification is mainly dividing the sub-block images into three categories: sub-block image I containing the crack regions of accumulation, sub-block image II which is adjacent to the sub-block image I in location and does not contain the regions of accumulation, and sub-block image III which does not contain the crack regions of accumulation and is not adjacent to the sub-block image I.

step 3-3. segmenting the sub-blocks of different categories according to different thresholds. The maximum grayscale value of ROA in the sub-block image is selected as the segmentation threshold for sub-block I, the segmentation threshold of sub-block II can refer to the segmentation threshold of the adjacent sub-block image I, and the segmentation threshold can be calculated by analyzing the differences between their gray-scale distribution dispersions i.e. the variance, that is:

$$T_{II} = T_I \times (\eta_{II}/\eta_I) \quad (3)$$

in the formula, $T_I$ is the segmentation threshold of sub-block image I, $T_{II}$ is the segmentation threshold of sub-block image II, $\eta_I$ is the variance of sub-block image I after removing the connected regions, and $\eta_{II}$ is the variance of sub-block image II.

Figure 2:
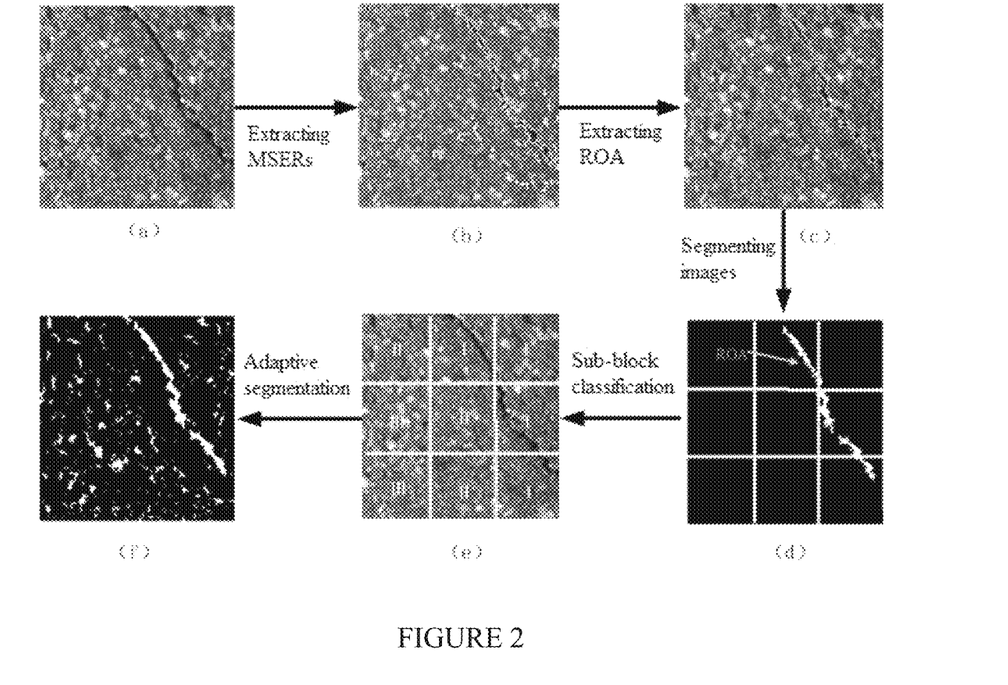
Figure 10:
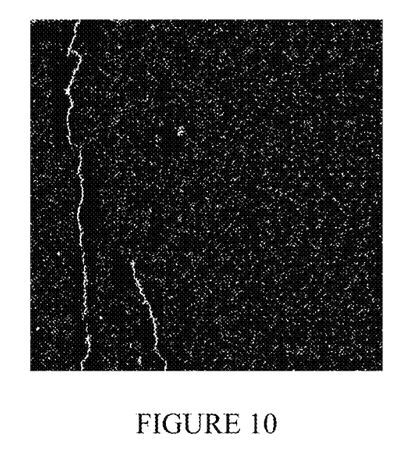
FIG. 10 is an effect diagram of image segmentation.

Sub-block image III is relatively independent, and it has a low probability of containing crack regions, but it still needs to be considered to avoid missing small cracks. Sub-block image III is divided and subjected to the binary image processing by the present specific embodiment with iterative threshold selection algorithm. The segmentation process is illustrated in FIG. 2, and the entire effect is illustrated in FIG. 10.

Figure 11:
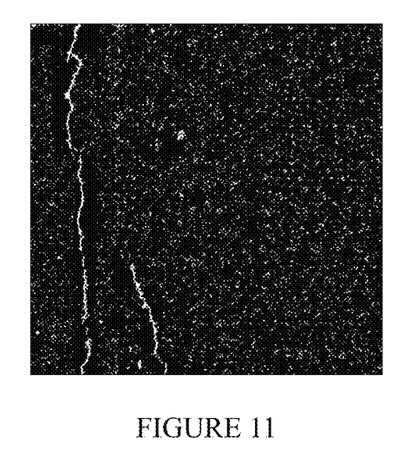
FIG. 11 is an effect diagram after the second round of compensation.
Figure 12:
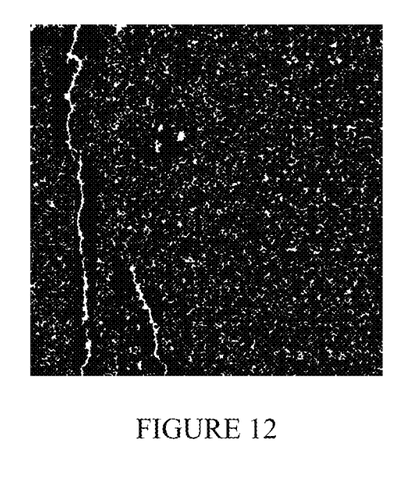
FIG. 12 is an effect diagram after the close operation.

The iterative threshold selection algorithm is as follows:

i. selecting an initial threshold $T_0$, provided that the maximum and minimum grayscale value in sub-block image III is $G_{max}$, $G_{min}$ respectively, wherein, $$T_0 = (G_{max} + G_{min})/2 \quad (3)$$

ii. for the $t^{th}$ iteration, threshold $T_t$ divides the image into two parts of foreground and background. Calculating the grayscale mean values $M_{t(B)}$, $M_{t(F)}$ of these two parts.

iii. calculating the new threshold $T_{t+1}$ of the t+1th iteration.

$$T_{t+1} = (M_{t(B)} + M_{t(F)})/2 \quad (4)$$

iv. if $T_{t+1}$ and $T_t$ satisfy the formula $T_{t+1} = T_t$, terminating the iteration, otherwise, proceeding to step ii.

step 3-4. due to the weak continuity of the cracks, the small ones represent spot-shaped fractures on the binary images after adaptive threshold segmentation. The present invention adopting a post-processing based on morphology for the segmented images, enhancing the continuity of the cracks and guaranteeing the completeness of crack detection. The specific operation flow is as follows:

step 3-4-1. the first round of compensation: determining whether the grayscale value difference between the background pixel points and the surrounding pixel points of interest satisfies the preset range, if satisfied, compensating.

step 3-4-2. the second round of compensation: compensating according to whether the grayscale value difference between the background pixel points and the pixel points of interest which are centered on the background with a certain direction within the preset range satisfies the preset range. The compensation effect is illustrated in FIG. 11.

step 3-4-3. performing a close operation for the images processed by the adaptive threshold segmentation, and the close operation effect is illustrated in FIG. 12.

Step 4. For general pavement images, the suspected crack regions of accumulation comprise some regions generated by interference factors such as water stains, debris, grease, shadow edges etc. other than crack regions. In order to reduce the false detection, it is necessary to filter out these interference regions according to certain rules. It is found by observations that with respect to these interference factors, cracks have more distinct linear features and smaller proportion in particular regions. The extraction method for confidence regions of cracks proposed by the present invention establishes a confidence judgment criterion to set the regions with large confidence as the seed regions for subsequent region growth, effectively reducing the false detection, and improving the detection accuracy.

In several connected regions extracted by the image segmentation process, not all the confidences that the region belongs to damages are high. The present invention comprehensively uses the geometry, spatial locations and gray-scale statistic features of the connected regions to establish a target determination system to screen out the regions with distinct confidence. For the screened regions, those with close locations and similarities are connected and merged to form ROC, according to the features of the spatial locations and regional similarity between the regions. The specific operation flow is as follows:

selecting 4 evaluation factors according to the geometry, grayscale features and spatial locations of the cracks, so as to constitute the feature vector X=(Len, $S_{ratio}$, $I_{ratio}$, Pos) of the crack regions. Wherein, Len is the effective length of the connected region, i.e. the longest side of the circumscribed rectangle with the smallest area, the value reflects the linear feature of the crack.

$S_{ratio}$ is the area ratio of the circumscribed rectangle ($S_{MBR}$) with the smallest area to the smallest circumscribed circle ($S_{MCC}$) in the region.

$I_{ratio}$ is the ratio of the grayscale mean value of the connected region in the original image to that of the region enclosed by the circumscribed rectangle with the smallest area of this connected region. $I_{ratio}$ can serve as the basis of distinguishing chap, block-crack region and noise region.

Pos refers to the spatial location of the region, the regions with close spatial locations may belong to the same crack region, and the location relation between two connected regions may be determined by the location relation of their smallest circumscribed rectangles.

In the process of extracting ROC, the regions with distinct linear features preliminarily screened by the three feature vectors of Len, $S_{ratio}$ and $I_{ratio}$ are selected as ROC first. If Len>$T_{Len}$ and $S_{ratio}$<$T_{S_{ratio}}$, or Len>$T_{Len}$ and $S_{ratio}$>=$T_{S_{ratio}}$ and |$I_{ratio}$-1|<$T_{I_{ratio}}$; determining this region as ROC; otherwise, removing this region as a noise region. And then merging the ROC with close spatial locations according to Pos feature vector to enhance the confidence region features. Table 1 is illustrated as an example.

TABLE 1

Feature Values of the Connected Regions

| connected regions | 1 | 2 | 3 | 4 | 5 | 6 | 7 | 8 | 9 | 10 |
|---|---|---|---|---|---|---|---|---|---|---|
| Len | 89.16 | 62.37 | 24.13 | 11.31 | 10.61 | 9.85 | 8.92 | 8.92 | 8.32 | 8.06 |
| $S_{ratio}$ | 0.25 | 0.23 | 0.34 | 0.38 | 0.39 | 0.35 | 0.24 | 0.24 | 0.41 | 0.20 |
| $I_{ratio}$ | 0.85 | 0.88 | 0.94 | 0.94 | 1.02 | 0.97 | 0.97 | 0.97 | 0.92 | 1.03 |

Figure 3:
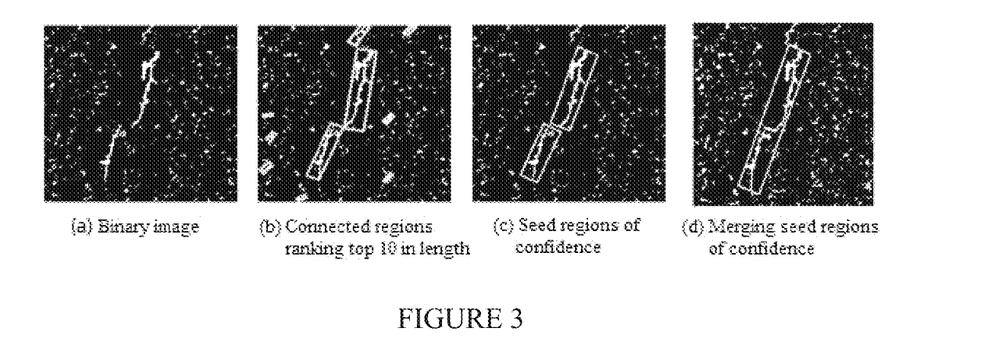

Illustrated in Table 1 are the feature values of Len, $S_{ratio}$ and $I_{ratio}$ of the connected regions ranking top 10 in lengths in FIG. 3(a), the corresponding connected regions are illustrated as the circumscribed rectangles of FIG. 3(b). Provided that the length threshold $T_{Len}=20$, the area ratio threshold $T_{S_{ratio}}=0.3$, the grayscale ratio threshold $T_{I_{ratio}}=0.05$, two connected regions that satisfy the conditions according to the principle above are screened out, i.e. connected regions 1 and 2, which are referred to as ROC, as illustrated by the circumscribed rectangles of FIG. 3(c). Further, since the smallest circumscribed rectangles of ROC intersect and the directions thereof satisfy the given threshold, the ROCs are merged to obtain a new ROC, the merging effect is illustrated in FIG. 3(d).

Step 5. Pavement cracks are represented as being developed from short, thin to long, thick, from simple transverse cracks, longitudinal cracks to crisscross block-shaped cracks and chaps. It can be seen by observing a large number of pavement image samples that, no matter what type the cracks are, they all grow from several simple cracks along a certain trend to the surroundings. By the observations above, the present invention proposes an method for evaluating the crack growth direction with crack segment weighting from complex cracks to simple cracks, which can accurately reflect the development trend of cracks.

Figure 4:
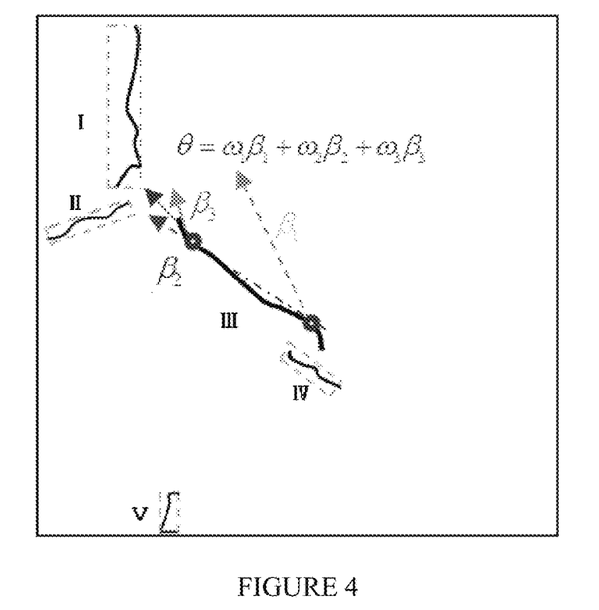
FIG. 4 is a schematic diagram of the obtaining method for the directions of the confidence regions.

The actual cracks obtained from crack segments are the result based on the accurate growth of the crack segments; the growth of the cracks needs to be based on the accurate crack development trend. An accurate evaluation for the crack development trend and a reasonable crack growth are critical factors of crack detection. The method for evaluating the crack development trend based on segment weighting segments the cracks firstly according to the linearity, turning point and other preset criteria, as illustrated in FIG. 4, crack III is divided into three small segments at two small circles according to the linearity of local regions, the linearity of the segmented cracks is more distinct. On the basis of this, the development trend of each small crack segment is evaluated with the method for extracting the direction features of linear targets, as illustrated in FIG. 4, the illustrated directions of the arrows corresponding to the dash line, dotted line and solid line are the development trends of the three crack segments from bottom to top evaluated by linear fitting method. Finally, according to the location information of each crack segment, analyze the influence of its direction feature vector on the development trend of the crack, assign feature weight to each segment according to different influences, and obtain the development trend θ of the crack by weighting calculation according to formula (1) based on the feature weights, as illustrated by the arrow corresponding to the dotted line of FIG. 4.

$$\theta=\omega_1\beta_1+\omega_2\beta_2+\ldots+\omega_n\beta_n \qquad (1)$$

in the formula, $\omega_1, \omega_2, \ldots \omega_n$ are feature weights set according to the different degrees of influence, n represents the crack is divided into n segments, $\omega_1+\omega_2+\ldots+\omega_n=1$. The effect is illustrated in FIG. 4.

Figure 5A:
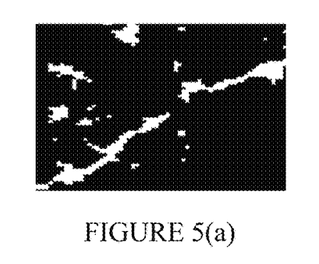
FIG. 5(a) is a binary image containing the confidence regions.
Figure 5B:
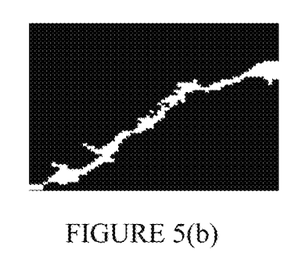
FIG. 5(b) is a binary image after confidence region is grown.
Figure 13:
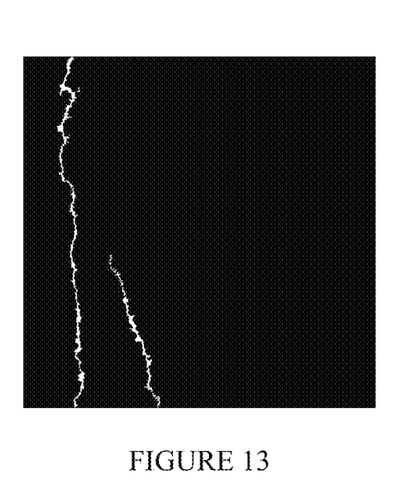
FIG. 13 is n region growth effect diagram of ROC.

Since pavement cracks have the feature of weak continuity and a complete crack cannot be detected at one time by whichever threshold segmentation, binary image processing method, therefore it can be learnt from the idea of region growth to connect the adjacent and close regions according to certain rules. It is a mainstream method to solve the completeness problem of crack detection at present by extending towards the two ends along the crack growth trend based on the detected crack segments. There are usually problems of overgrowth or undergrowth in the conventional crack growth methods due to the inappropriate selection of seed regions and inaccurate determination of crack growth trend, resulting in that the accuracy of the region growth is not high and the efficiency is low. The crack growth method proposed by the present invention uses the confidence regions as the seed regions, calculates the development trend of the cracks with the evaluation method for crack growth direction by crack segment weighting, and then grows according to the similarity criterion along this development trend, thereby improving the accuracy and efficiency of the region growth and guaranteeing the completeness of the crack detection. The specific operation flow is as follows:

step 5-1. extracting the feature vectors of the directions and lengths of all ROCs. Obtaining the direction feature vectors of ROCs with the evaluation method for crack growth trend, and calculating the length feature vectors of the ROCs according to the circumscribed rectangles with the smallest area of ROCs.

step 5-2. calculating search range from the longest ROC.

step 5-3. searching all growable regions within the range.

step 5-4. merging ROCs and the growable regions. For all regions in the growable region set, merging the regions with close locations sequentially according to the spatial location relation between ROCs and the growable regions, then terminating the ROC growth.

step 5-5. determining the composition of cracks. If the current ROC growth stops, determining whether the crack conditions are satisfied according to the total length $R_{growlen}$ of the grown regions.

step 5-6. extending the next ROC., repeating step 5-2 to step 5-5 from the next ROC till the growths of all ROCs are completed, at this time, the region growth is completed. The extension effect is illustrated in FIGS. 5 and 13.

Finally, it should be noted that the specific embodiments above are only used to explain the technical solutions of the present invention, and are not intended to be limiting thereto; although the present invention has been described in detail with reference to the preferable embodiments, it should be understood by those of ordinary skills in the art that the technical solutions of the present invention may be modified or equivalently replaced without departing from the spirit and scope of the technical solutions of the present invention, all of the modifications and replacements should be within the scope of the claims of the present invention.

What is claimed is:

1. A stepwise refinement detection method for pavement cracks, comprising collecting pavement images, analyzing the pavement images, wherein analyzing the pavement images comprises the following steps:

extracting suspected crack regions of accumulation (ROA), comprising: extracting connected regions with certain grayscale features in the pavement images, screening the connected regions according to certain preset conditions to obtain the suspected crack regions of accumulation, the preset conditions are prior obtained according to geometric features of the crack regions;

extracting the crack regions of confidence (ROC), comprising:

for screened ROA regions, establishing a target determination system to screen out initial crack confidence regions with a certain degree of crack confidence by the geometry, spatial location and grayscale statistic features of ROA regions;

for the initial crack confidence regions, connecting and merging the regions with close locations and similarities according to the spatial locations and regional similarities between the initial crack confidence regions, so as to form enhanced crack confidence regions, i.e. the crack regions of confidence ROC;

determining region growth based on ROC direction feature weighting, comprising:

step 4-1, extracting feature vectors of the directions and lengths of all ROCs;

step 4-2, calculating search range from the longest ROC;

step 4-3, searching all growable regions within the range;

step 4-4, merging ROCs and the growable regions: for all regions in the growable region set, merging the regions with close locations sequentially according to the spatial location relation between ROCs and the growable regions, then terminating the current ROC growth;

step 4-5, determining the composition of cracks: if the current ROC growth stops, determining whether the crack conditions are satisfied according to the total length Rgrowlen of the grown regions; if satisfied, proceeding to step 4-6, otherwise the region growth is completed;

step 4-6, extending the next ROC: repeating the step 4-2 to step 4-5 from the next ROC till the growths of all ROCs are completed, then the region growth is completed; and wherein before extracting the crack regions of confidence ROC, the method further comprises the step:

segmenting the images by adaptive threshold based on ROA, comprising:

dividing the images into non-overlapping sub-block images, the sub-block images comprising sub-block image I containing the suspected crack regions of accumulation, sub-block image II which is adjacent to the sub-block image I in location and does not contain the suspected crack regions of accumulation, and sub-block image III which does not contain the suspected crack regions of accumulation and is not adjacent to the sub-block image I;

segmenting the sub-block images I, II and III according to different thresholds respectively; wherein, the segmentation threshold for the sub-block image I is determined according to the gray scale feature of the ROA, the segmentation threshold for the sub-block image II is determined by referring to the adjacent sub-block image;

wherein the sub-block image III is segmented according to the features thereof; and obtaining the binary image of each sub-block image respectively.

2. The stepwise refinement detection method for pavement cracks of claim 1, wherein after segmenting the images by adaptive threshold for ROAs, the method further comprises the step:

the first round of compensation: determining whether the grayscale value difference between the background pixel points and the surrounding pixel points of interest satisfies the preset range, if satisfied, compensating;

the second round of compensation: compensating according to whether the grayscale value difference between the background pixel points and the pixel points of interest which are centered on the background with a certain direction within the preset range satisfies the preset range, if satisfies, compensating;

performing a close operation for the images processed by the adaptive threshold segmentation.

3. The stepwise refinement detection method for pavement cracks of claim 1, wherein the direction feature weighting method in step S4-1 comprises the following steps:

segmenting the ROC according to linear similarity;

calculating the direction feature vector of each segment;

analyzing the influence of the direction feature vector on the development trend of the crack according to the location information thereof;

assigning a feature weight to each segment based on the influence;

obtaining the development trend θ of the crack in ROC by weight calculating according to formula (1) based on the feature weights, $$\theta = \omega_1\beta_1 + \omega_2\beta_2 + \ldots + \omega_n\beta_n \quad (1)$$

in the formula, $\omega_1, \omega_2, \ldots \omega_n$ are feature weights set according to the different degrees of influence, n represents the crack is divided into n segments, $\omega_1 + \omega_2 + \ldots + \omega_n = 1$.

4. The stepwise refinement detection method for pavement cracks of claim 1, wherein screening the initial crack regions of confidence specifically comprises:

setting Len as the effective length of the current connected region, i.e. the longest side of the circumscribed rectangle with the smallest area, this value reflects the linear feature of the crack; setting $S_{ratio}$ as the area ratio of the circumscribed rectangle $S_{MBR}$ with the smallest area to the smallest circumscribed circle $S_{MCC}$ in ROA region; setting $I_{ratio}$ as the ratio of the grayscale mean value of the connected regions in the original image to that of the region enclosed by the circumscribed rectangle with the smallest area of the current connected region; $I_{ratio}$ is the basis of distinguishing chap, block-crack region and noise region;

if $Len > T_{Len}$ and $S_{ratio} < T_{S_{ratio}}$, or $Len > T_{Len}$ and $S_{ratio} >= T_{S_{ratio}}$ and $|I_{ratio} - 1| < T_{I_{ratio}}$, determining this region as the initial crack region of confidence; otherwise, removing this region as the noise region.

5. The stepwise refinement detection method for pavement cracks of claim 4, wherein forming the enhanced crack regions of confidence comprises:

setting Pos as the spatial location of the initial crack region of confidence, merging the initial crack regions of confidence with close spatial locations to Pos to form enhanced crack region of confidence.

6. The stepwise refinement detection method for pavement cracks of claim 1, wherein it comprises a processing step of removing the marking lines in the images before extracting the suspected crack regions of accumulation ROA.

7. The stepwise refinement detection method for pavement cracks of claim 6, wherein the processing step of removing marking lines in the images comprises:
   extracting marking line regions, comprising:
   dividing complex pavement images into non-overlapping sub-block images according to the grayscale and morphological features of the road marking lines,
   obtaining the segmentation threshold of the sub-block images according to the differences between the grayscale distribution features of the road marking lines and pavement background, binarizing the sub-block images by the threshold;
   merging the binarized sub-block images to obtain a number of connected regions comprising noise regions and marking line regions, distinguishing the noise regions and the marking line regions according to the features of the marking line regions;
   marking the marking line regions;
   processing the marking line regions, comprising: replacing the marking line regions with the image regions around the grayscale corrected marking lines according to marking values of the marking lines, or excluding the marking line regions for consideration in the subsequent process.

8. A stepwise refinement detection method for pavement cracks, comprising collecting pavement images and analyzing the pavement images, wherein the analyzing of the pavement images comprises the following steps:
   extracting suspected crack regions of accumulation (ROA) comprising extracting connected regions with certain grayscale features in the pavement images, screening the connected regions according to certain preset conditions to obtain the suspected crack regions of accumulation wherein the preset conditions are prior obtained according to geometric features of the crack regions;
   extracting the crack regions of confidence (ROC) comprising:
      for screened ROA regions, establishing a target determination system to screen out initial crack confidence regions with a certain degree of crack confidence by the geometry, spatial location and grayscale statistic features of ROA regions; and
      for the initial crack confidence regions, connecting and merging the regions with close locations and similarities according to the spatial locations and regional similarities between the initial crack confidence regions, so as to form enhanced crack confidence regions, i.e. the crack regions of confidence ROC;
   wherein before extracting the crack regions of confidence ROC, the method further comprises the step of segmenting the images by adaptive threshold based on ROA comprising:
      dividing the images into non-overlapping sub-block images, the sub-block images including sub-block image I containing the suspected crack regions of accumulation, sub-block image II which is adjacent to the sub-block image I in location and does not contain the suspected crack regions of accumulation, and sub-block image III which does not contain the suspected crack regions of accumulation and is not adjacent to the sub-block image;
      segmenting the sub-block images I, II and III according to different thresholds respectively,
   wherein the segmentation threshold for the sub-block image I is determined according to the grayscale feature of the ROA, the segmentation threshold for the sub-block image II is determined by referring to the adjacent sub-block image, and the sub-block image III is segmented according to the features thereof; and
   obtaining the binary image of each sub-block image respectively.

* * * * *